Figure 1:
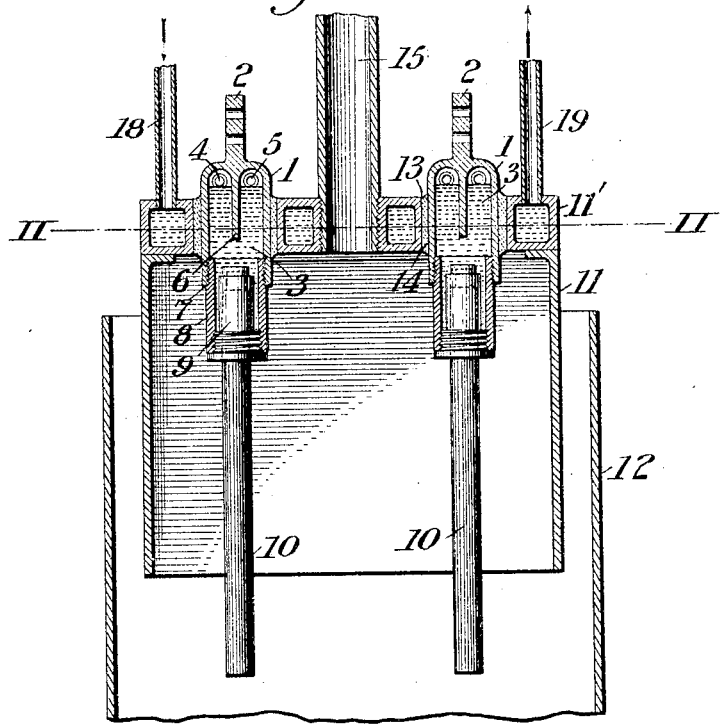

No. 809,842. PATENTED JAN. 9, 1906.
E. F. PRICE, G. E. COX & J. G. MARSHALL.
APPARATUS FOR THE PRODUCTION OF CALCIUM CARBID.
APPLICATION FILED OCT. 19, 1904.

2 SHEETS—SHEET 1.

Witnesses:
R. A. Balderson.
J. B. Hill.

Inventors:
Edgar F. Price,
George E. Cox,
James G. Marshall,
by Byrnes & Townsend,
Att'ys.

No. 809,842. PATENTED JAN. 9, 1906.
E. F. PRICE, G. E. COX & J. G. MARSHALL.
APPARATUS FOR THE PRODUCTION OF CALCIUM CARBID.
APPLICATION FILED OCT. 19, 1904.
2 SHEETS—SHEET 2.
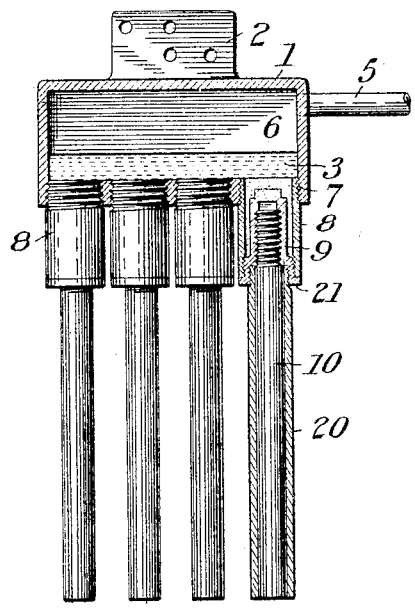
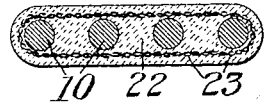
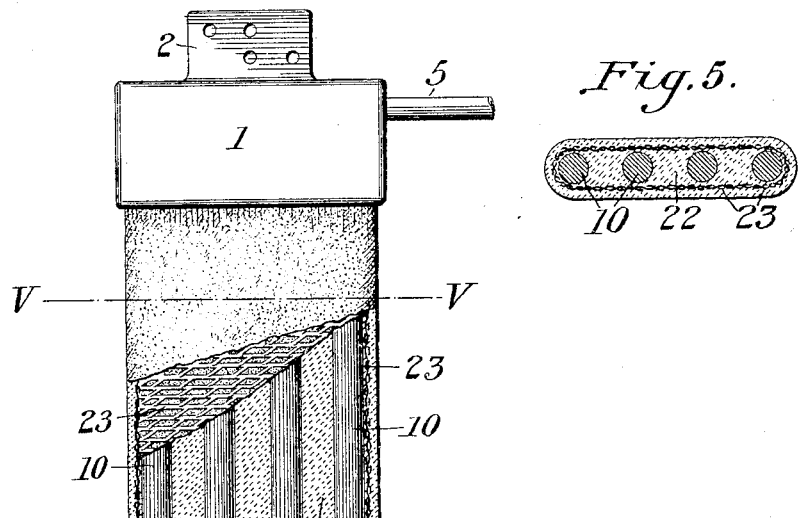
Witnesses:
R A Balderson
J. B. Hill
Inventors
Edgar F. Price,
George E. Cox,
James G. Marshall,
by Byrnes & Townsend,
Att'ys.

UNITED STATES PATENT OFFICE.

EDGAR F. PRICE, GEORGE E. COX, AND JAMES G. MARSHALL, OF NIAGARA FALLS, NEW YORK, ASSIGNORS TO UNION CARBIDE COMPANY, OF NIAGARA FALLS, NEW YORK, A CORPORATION OF VIRGINIA.

APPARATUS FOR THE PRODUCTION OF CALCIUM CARBID.

No. 809,842.  Specification of Letters Patent.  Patented Jan. 9, 1906.

Application filed October 19, 1904. Serial No. 229,169.

*To all whom it may concern:*

Be it known that we, EDGAR F. PRICE, GEORGE E. COX, and JAMES G. MARSHALL, citizens of the United States, residing at Niagara Falls, in the county of Niagara and State of New York, have invented certain new and useful Improvements in Apparatus for the Production of Calcium Carbid, of which the following is a specification.

The manufacture of calcium carbid has heretofore been carried out in electric furnaces employing electrodes of any usual carbon composition—for example, a molded and baked mixture of ground coke and tar. Graphite electrodes have been considered undesirable and impracticable for this use on account of their high cost, their oxidizability, and especially their high specific-heat conductivity. Graphite electrodes of the same dimensions now cost about three times as much as the carbon electrodes heretofore used in carbid-furnaces. If such graphite electrodes were substituted for the carbon electrodes, they would transmit so much heat from the zone of reduction to the usual iron holders that the latter would soon be destroyed. If injury of the holders were delayed by the use of special cooling means, nevertheless on account of their high temperature the life of the graphite electrodes would be shorter than that of the ordinary carbon ones. Any decrease in the diameter of the graphite rods to decrease their cost and heat-carrying capacity would render their life much shorter than that of the carbon rods. The cost of electrodes is one of the important factors in the cost of carbid, and the specified reasons have prevented the use of graphite, notwithstanding its high electrical conductivity, uniform composition, and the ease with which it can be machined. We have now determined certain conditions under which graphite rods can be used for the production of calcium carbid without materially increasing the cost of the electrodes, while their life is so greatly lengthened that the final cost is reduced to a minimum. We have first reduced the cross-section of the electrode-rods in proportion to the increased density of the current which the graphite will carry without being unduly heated. This change suitably decreases the heat conductivity of the rods, but renders them mechanically weak, so that they would break in the furnace. They would also soon be destroyed by oxidation. We have therefore placed a strong body of refractory cement of relatively high resistance between and around the graphite rods, thus mechanically supporting them and protecting them from oxidation. We have also provided efficient means for cooling the metal holders.

The invention will be readily understood by reference to the accompanying drawings, in which—

Figure 2:
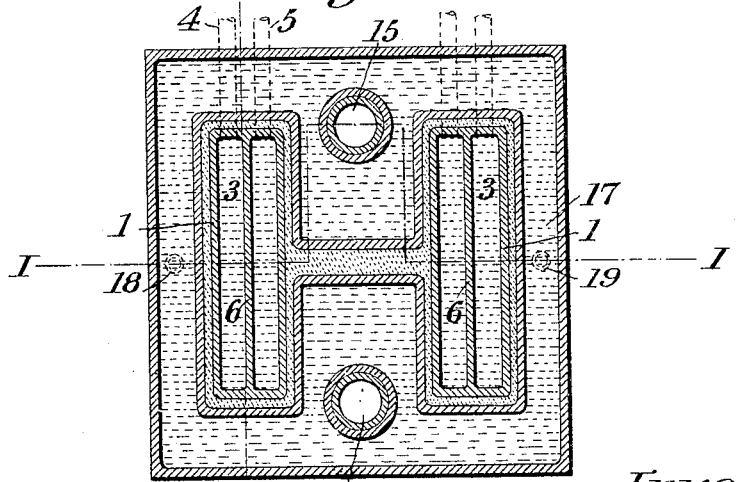

Figure 1 is a vertical transverse section through a pair of electrodes supported in the hood of a calcium-carbid furnace, the section being taken on the line I I of Fig. 2. Fig. 2 is a horizontal section through the top plate of the hood, taken on the line II II of Fig. 1. Fig. 3 is a vertical longitudinal section through one of the electrode-holders, showing a metal sheath in section upon one of the electrode-rods. Fig. 4 is a side elevation of an electrode, partly in section, to show the filling of refractory cement and the support of foraminous metal; and Fig. 5 is a horizontal section through the electrode on the line V V of Fig. 4.

The electrode-holder consists of a head 1, of cast-iron, having a perforated lug 2, which serves as a terminal and support for the electrode. Within the holder is a water-chamber 3, having supply and discharge pipes 4 5. A longitudinal depending baffle 6 extends from the top nearly to the bottom of the water-chamber. A number of threaded openings 7 extend through the lower wall of the head 1, and each of these openings receives a nipple 8. An electrode-socket 9 is threaded into the lower end of each nipple and projects upward within the nipple, leaving an intermediate space for the circulation of water. The upper end of each graphite electrode-rod 10 is threaded and screwed into one of these sockets, making good electrical contact with it. The length of the depending nipples makes it possible to use short electrode-rods, thus decreasing the length of the stubs which remain when the rods have been consumed as far as possible and enabling a greater percentage of the length to be utilized. The stubs may also be threaded together and used for the electrode-rods.

The well-known Horry furnace for the production of calcium carbid employs a hood which receives the electrodes and depends into the working chamber of the furnace. One of these hoods 11 is shown in section in Fig. 1, depending into the working chamber 12 of the furnace. A pair of electrodes is shown, the holder of each electrode extending through an opening 13 in the top plate 11' of the hood. The space between the electrode-holders and the top plate is filled with a luting 14, of refractory cement. A pipe 15 for supplying the furnace charge of lime and coke opens through the top plate at the rear and a pipe 16 for removing the waste gases leads from the top plate at the front. To assist in removing the heat from the electrode-holders, as well as to reduce the temperature of the hood itself, it has been found desirable to make the top plate 11' of cast-iron with an internal water-chamber 17, having a supply-pipe 18 and a discharge-pipe 19.

One or more of the electrode-rods may be inclosed in a closely-fitting iron sheath 20, as shown in Fig. 3. The graphite rod is preferably coated with tar before being pushed into the sleeve. Air is thus entirely excluded from the surface of the rod. The upper end of the sleeve 20 may be threaded into a counterbore 21 in the lower end of the corresponding socket 9. The electrode-rods are mechanically reinforced and strengthened and at the same time protected from oxidation by a body of refractory cement of relatively high resistance, which is filled between and around the rods. This cement may consist of ordinary asbestos or furnace-cement mixed with ground bituminous coal and siloxicon. To strengthen the body of cement and prevent it from scaling off from the rods when heated, a support 23, of thin foraminous metal, such as "expanded iron," is wrapped around the rods and plastered over with the cement.

This invention makes it possible to use graphite electrodes in a calcium-carbid furnace. The greater cost of the graphite is offset by the reduction in the cross-section and length of the electrode-rods. The rods of reduced cross-section are efficiently strengthened and protected from oxidation by the reinforcing-body of cement. The water-cooled holders and electrode-sockets prevent the metal parts from burning out, and the long socket-nipples decrease the stub waste of the electrodes.

The claims of this application are specifically limited to the production of calcium carbid, claims for the electrodes and electrode-holders for general use being presented in our application, Serial No. 177,607, filed October 19, 1903.

We claim—

1. In an electric furnace for the production of calcium carbid, and in combination with a feed-supply of lime and carbon, electrodes consisting of graphite rods of reduced cross-section, means for supplying to the electrodes an electric current of sufficient amperage to give a high current density in the electrodes and effect the reduction of the charge, means for substantially excluding oxidizing gases within the charge from the sides of said rods and means for withdrawing heat from the ends of the electrodes remote from the zone of reduction, as set forth.

2. In an electric furnace for the production of calcium carbid, and in combination with a feed-supply of lime and carbon, electrodes each consisting of spaced graphite rods, means for supplying to the electrodes an electric current of sufficient amperage to give a high current density in the electrodes and effect the reduction of the charge, a jacket surrounding the electrode-rods for excluding gases therefrom, and means for withdrawing heat from the ends of the electrodes remote from the zone of reduction, as set forth.

3. In an electric furnace for the production of calcium carbid, and in combination with a feed-supply of lime and carbon, electrodes consisting of graphite rods of reduced cross-section, means for supplying to the electrodes an electric current of sufficient amperage to give a high current density in the electrodes and effect the reduction of the charge, means for substantially excluding oxidizing gases from the sides of the rods and for supporting them against breakage, and means for withdrawing heat from the ends of the electrodes remote from the zone of reduction, as set forth.

4. In an electric furnace for the production of calcium carbid, and in combination with a feed-supply of lime and carbon, electrodes consisting of graphite rods of reduced cross-section, means for supplying to the electrodes an electric current of sufficient amperage to give a high current density in the electrodes and effect the reduction of the charge, a reinforcing and protecting body of relatively high resistance surrounding said rods, and means for withdrawing heat from the ends of the electrodes remote from the zone of reduction, as set forth.

In testimony whereof we affix our signatures in presence of two witnesses

EDGAR F. PRICE.
GEORGE E. COX.
JAMES G. MARSHALL.

Witnesses:
A. A. MOSHER,
C. E. BILLINGS.